United States Patent [19]

Highley et al.

[11] 4,105,419

[45] Aug. 8, 1978

[54] FLUIDIZED BED APPARATUS

[75] Inventors: John Highley; Michael Alan Vickers, both of Cheltenham, England

[73] Assignee: Coal Industry (Patents) Limited, London, England

[21] Appl. No.: 776,616

[22] Filed: Mar. 11, 1977

[30] Foreign Application Priority Data

Mar. 26, 1976 [GB] United Kingdom ............... 12197/76

[51] Int. Cl.² ............................................... C10J 3/54
[52] U.S. Cl. ...................................... 48/61; 23/288 S; 48/101; 48/120; 110/244; 201/31; 202/134
[58] Field of Search ..................... 48/61, 101, 120, 99, 48/77, 76; 23/288 S; 201/31; 202/134; 110/28 J, 31; 122/4 D, 5

[56] References Cited

U.S. PATENT DOCUMENTS

| 3,169,835 | 2/1965 | Huntley et al. ............... 23/288 S |
| 3,851,406 | 12/1974 | Dumitru et al. ............... 23/288 S |
| 3,983,931 | 10/1976 | Whitehead et al. ............... 122/4 D |

FOREIGN PATENT DOCUMENTS

| 1,032 of | 1872 | United Kingdom ............... 48/101 |
| 1,431,763 | 4/1976 | United Kingdom ............... 122/4 D |

Primary Examiner—Robert L. Lindsay, Jr.
Assistant Examiner—George C. Yeung
Attorney, Agent, or Firm—Stevens, Davis, Miller & Mosher

[57] ABSTRACT

A fluidized bed apparatus suitable for the combustion of fuel has a baffle assembly arranged in the freeboard above the fluidized bed level. The assembly is in the form of a perforate duct which defines within it a passage connecting with the gas exit of the apparatus. Gases issuing from the bed, in use, and carrying bed material impinge upon the duct and are arranged to follow a vortical path around the duct, resulting in a deceleration of the particles which fall back into the bed. The gases pass into the duct for exhaust substantially free from contamination by bed material. The baffle assembly is of particular value where a gas flows horizontally to a gas exit and prevents or substantially reduces elutriation.

7 Claims, 8 Drawing Figures

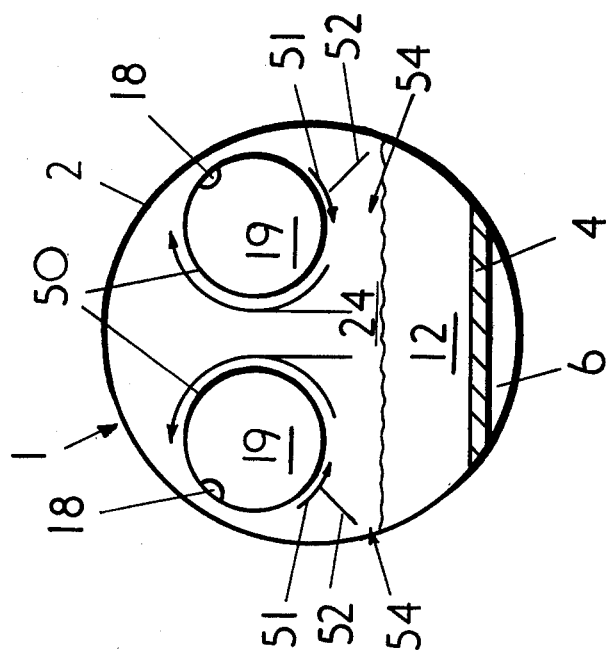
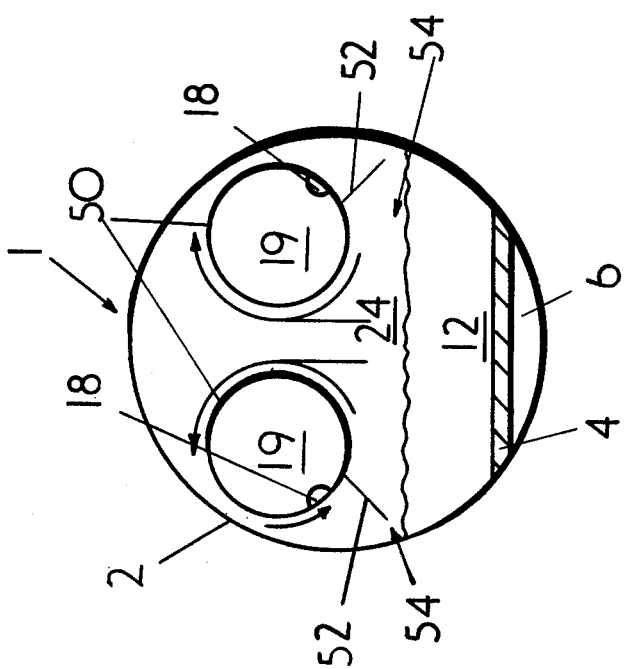
FIG. 4.
FIG. 3.

FLUIDIZED BED APPARATUS

This invention concerns improvements in or relating to fluidised bed apparatus.

One particular phenomenon of a fluidised bed is that of particle "splashing" into the freeboard above the bed. Such splashing is caused by the formation of gas bubbles which rise through the bed and erupt at the surface of the bed. In doing so, masses of particles are thrust or "splashed" into the freeboard and tend to become entrained in the gases issuing from the bed. If the freeboard height is sufficient, there is a height above the notional surface of the bed at which bed particles become disengaged from the transporting gas. This height will depend inter alia upon the size of the individual bed particle and the fluidising velocity.

It will be understood that some fine particles will not become disengaged in this way and will always possess a tendency to be entrained by the gas stream issuing from the bed. Such fine particles are those which arise for example from ash produced when combustion has taken place, or which are generated by abrasion. It is, however, the entrainment of particles of bed material as opposed to these fine particles which concerns the present invention.

In certain forms of fluidised bed apparatus in which in use the freeboard height is insufficient to allow of this disengagement, it has been found that a considerable loss of bed material results. This is particularly the case where a gas exit is located laterally of the bed whereby a substantially horizontal exit gas flow at high velocity is necessarily established giving rise to a substantial transport of splashed particles out of the bed.

It is an object of the present invention to provide a fluidised bed apparatus which assists in overcoming the problem of loss of bed material.

Accordingly the invention provides a fluidised bed apparatus including a body, a gas-permeable support plate located within the body for supporting, in use, a fluidised bed of particulate material, a gas exit provided in the body, and a baffle assembly interposed between the gas exit and the support plate at a location in use above the fluidised bed, the baffle assembly being provided with an aperture and including a passage for exit gas flow communicating with the gas exit.

Conveniently the body may be in the form of a cylindrical shell to be employed in a horizontal mode and having a gas exit located at one end thereof; the shell may be so formed as in use to give a relatively low freeboard height. Other forms of body may be employed.

The baffle assembly may comprise a duct provided with the aperture or plurality of apertures. The duct is located in the freeboard space with its axis in substantial parallelism with the support plate and communicates with the gas exit. The duct may be of any convenient cross-sectional shape, e.g. rectangular, but designs are preferred which encourage disengagement of bed particles from the gas stream as described below. The duct may be of circular section or of crescent shape in section. The baffle assembly may include more than one duct. In one embodiment the assembly has two ducts arranged side by side in spaced relation to one another and the body in the freeboard. The ducts are so spaced as in use to allow flow of exit gases around the ducts prior to their egress through the apertures into the passage to promote disengagement of particles from the gases by vertical action. In order to promote gas flow around the ducts, baffles may be provided in association with the ducts. Similar baffles may be employed when only one duct is employed as the baffle assembly.

In all embodiments, vertical baffles may be provided in the freeboard to prevent or impede horizontal flow of gas toward the exit.

By way of example only, six embodiments of fluidised bed apparatus according to the invention are described with reference to the accompanying drawings in which:

FIG. 3 is an end sectional elevation of a third embodiment;

FIG. 4 is an end sectional elevation of a fourth embodiment;

Figure 1B:
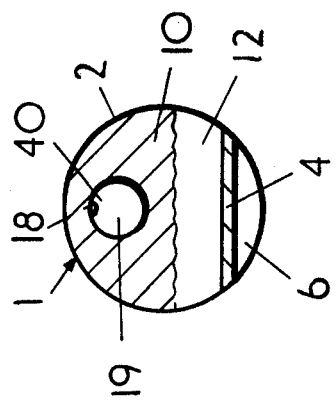
FIGS. 1a and 1b show side sectional and end sectional views respectively of a first embodiment.
Figure 1A:
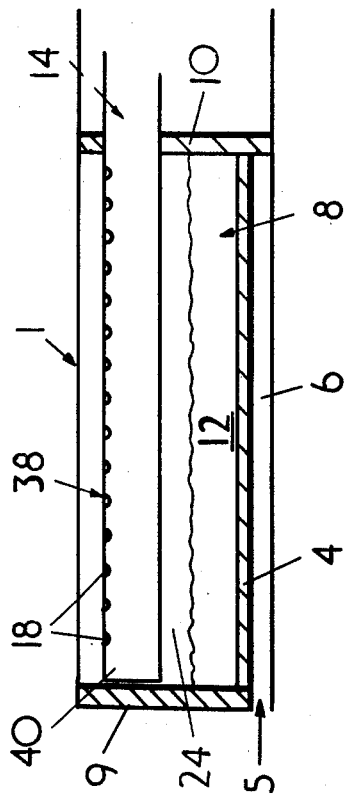

Referring to FIG. 1, a first embodiment of fluidised bed apparatus in the form of a combustor 1 includes a cylindrical body 2 having its longitudinal axis arranged horizontally. A gas-permeable support plate 4 is located within the body 2 to define a plenum chamber 6 therebelow and a primary combustion chamber 8 thereabove. The body 2 has two end walls, 9, 10 and these together with the body 2 serve to confine a bed 12 of particulate material, the plate 4 supporting the bed. A gas exit 14 is located at one end of the body 2 in the end wall 10. A baffle assembly 38 is located in the freeboard 24 above the bed and comprises a cylindrical duct 40 provided with apertures 18 in the top part thereof as shown, one end of the duct 40 being closed and the other end extending through and supported by the gas exit 14. The duct 40 includes a passage 19 there-within which communicates with a secondary combustion chamber 22.

In operation, the bed 12 is fluidised by air introduced by an inlet 5 into the plenum chamber 6, the air being distributed through the support plate 4 into the bed supported thereabove. Fuel is fed to the bed 12 for combustion therein and the gases issuing from the bed pass upwardly into the freeboard 24 above the bed. Because of the more or less random eruption of gas bubbles at the surface of the bed 12, the gas flow immediately above the bed is non-uniform. The eruption of each bubble projects gas and particles into the freeboard 24 at a velocity which may be several times the average gas velocity. As the gas approaches the duct 40, the vertical gas velocity becomes more uniform, the extent of the approach to uniformity being dependent upon the pressure drop across the duct. The impingement of the gases and thus the particles upon the duct 40 causes a deceleration of the particles, thereby arresting the particles which tend to fall back into the bed. Once the gases pass into the passage 19 through apertures 18, they travel horizontally toward the gas exit 14 and are isolated from the freeboard.

In the absence of a baffle assembly in a long fluidised bed vessel there would be horizontal gas flow towards the gas exit in the freeboard above the bed. The horizontal velocity would increase from the end of the vessel remote from the exit to the gas exit, due to increasing flow of gas from the bed. If the vertical cross sectional area of the freeboard were substantially less than the bed surface area, then the horizontal gas velocity in the freeboard adjacent the gas exit could be many times the fluidising velocity. This horizontal gas velocity would be sufficient to carry out of the vessel any particles ejected from the bed into the freeboard, and it would then be difficult to retain a fluidised bed in the vessel. The passage 19 of duct 40 prevents direct horizontal gas flow in the freeboard 24 to exit 14, providing that the pressure drop across the duct 40 is sufficient to ensure uniform gas flow through it along its length. Vertical baffles may be provided and may assist in preventing horizontal gas flow in the freeboard 24 and may allow the pressure drop across the duct 40 to be reduced. The horizontal gas velocity in the passage 19 is higher than if horizontal flow took place throughout the space above the bed, but because most bed particles are disengaged from the gas before it enters the passage 19, the loss of particles from the bed is substantially reduced by the baffle arrangement.

Figure 2B:
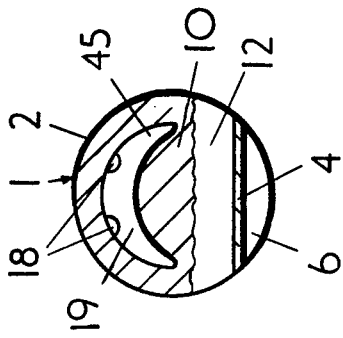
FIGS. 2a and 2b show side sectional and end sectional views respectively of a second embodiment.
Figure 2A:
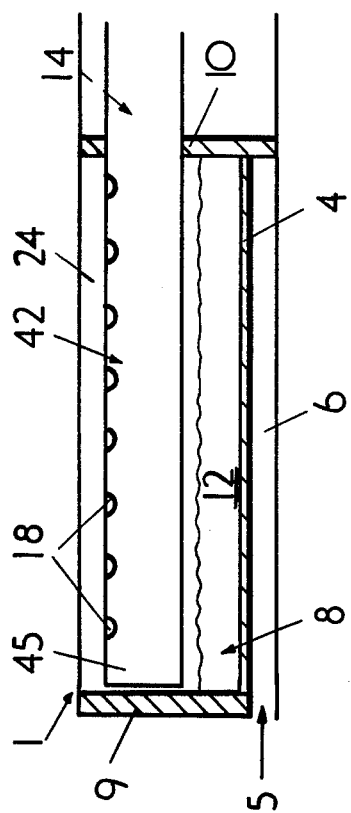

FIG. 2 shows a similar baffle assembly 42 to that illustrated in FIG. 1. The cross-sectional form of the duct 45 is of crescent-shape with the depression facing the bed 12 and the apertures 18 provided in two rows along the top of the duct 45. The operational result of this shape of baffle assembly is to encourage a greater intertia effect in the middle of the combustion chamber 8 than is attainable by employing a duct of circular cross-section.

In FIG. 3, the baffle assembly consists of two hollow cylindrical ducts 50 located within the freeboard 24 above the bed 12. Each duct 50 has a plurality of apertures or a slot 18 provided in its cylindrical wall at a location directed downwardly toward the bed 12 and the body 2 of the combustor 1. A baffle 52 is attached to each duct 50 and extends longitudinally thereof at a location such as substantially to shield the apertures from gases issuing directly from the bed 12 and to define a gap 54 with the body 2.

In operation, gases issuing from the bed 12 follow the path indicated by the arrows. The baffles 52 promote the gas flow around the ducts 50 in the direction indicated, the ducts 50 according a centrifuging force on entrained particles in the same manner as in a cyclone. The position of the apertures or slot 18 is chosen so that they receive gases at or after the point of maximum velocity thus maximising the effect of the cyclonic action, that is the maximum separation of entrained particles from the gases. The baffles 52 may be located at any convenient position on the ducts 50 preferably at an angle greater than the angle of repose of the bed material such that in use material cannot accumulate on the baffles and can fall back into the bed through gap 54.

Referring to FIG. 4, the baffle assembly includes two hollow cylindrical ducts 50 located within the freeboard 24 above the bed 12. Each duct 50 has a plurality of apertures or a slot 18 provided in its cylindrical wall at a location directed upwardly away from the bed 12 and toward the body 2 of the combustor 1. A baffle 52 is located adjacent but spaced from each duct 50 as indicated to define a gap 51 with the wall of the duct and a gap 54 within the body 2.

The operation of the fourth embodiment is similar to that described in relation to FIG. 3. The disposition of the baffles 52 promotes the flow of gases, as indicated by the arrows, around the ducts 50. The flow of gases induced by the baffles is of a spiral nature along the length of the ducts 50 passing through the gaps 51 thus allowing a multiple pass of gases around the duct 50 prior to their egress through apertures 18 into passage 19 in each duct. The entrained particles from the bed are thus subjected to an enhanced cyclonic action, separated particles passing through the gaps 54 into the bed 12.

Figure 5:
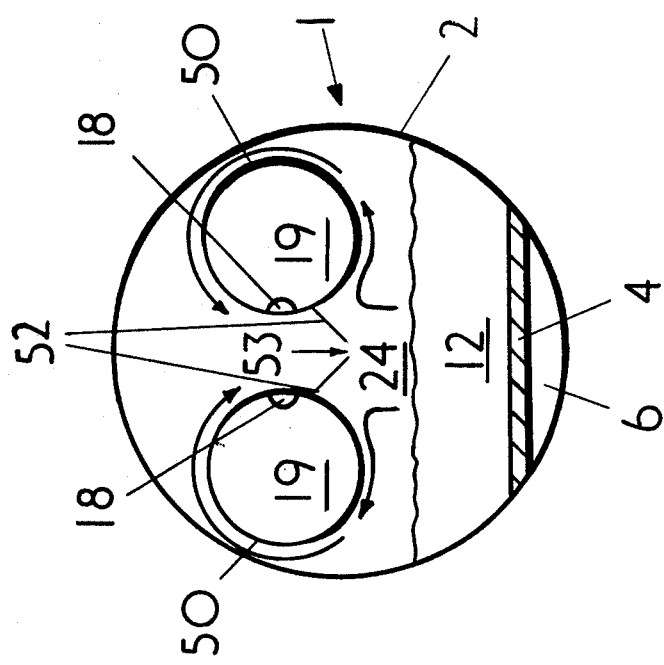
FIG. 5 is an end sectional elevation of a fifth embodiment.

With reference to FIG. 5, the baffle assembly includes two hollow cylindrical ducts 50 provided with apertures or a slot 18 and located within the freeboard 24 above bed 12. A baffle 52 is attached to each duct 50 as shown adjacent the apertures 18, the baffles 52 being directed toward each other to define a gap 53 between them. The operation of this embodiment is similar to that described in relation to FIG. 3 except that the flow of gases is in an opposite sense, i.e. the gases are first directed between the ducts 50 and the body 2 of the combustor 1 as indicated by the arrows. Particles of material separated due to the cyclonic effect of the gases passing around the ducts 50 return to the bed via the gap 53, the gases exhausting through the apertures 18 into the passage 19 and thence to the gas exit (not shown).

Figure 6:
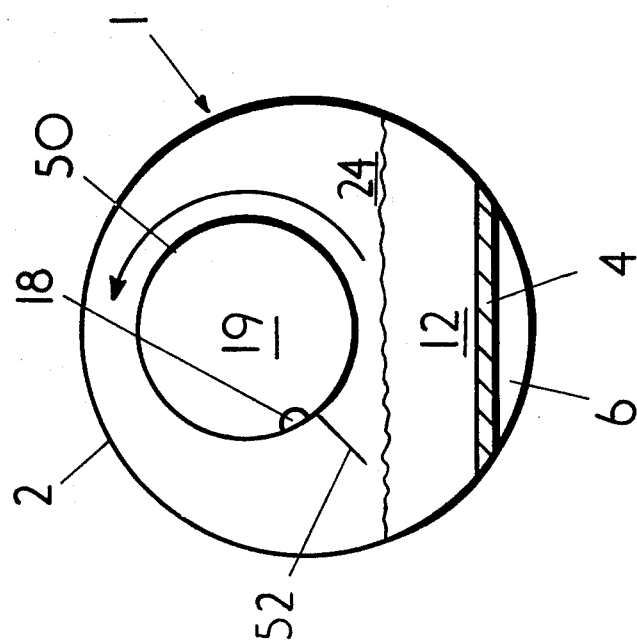
FIG. 6 is an end sectional elevation of a sixth embodiment. Like numerals of reference have been employed to denote like parts throughout the specification.

Referring now to FIG. 6, the baffle assembly here shown corresponds to the left-hand duct 50 of FIG. 3, as viewed in the drawing. The baffle 52 and the apertures 18 could be located to either side of the duct 50, the flow of gas around the duct changing accordingly.

It is to be understood that in the embodiment of FIGS. 3, 4 and 5 the two ducts 50 comprising the baffle assembly may be connected to a manifold for a single gas exit.

The present invention affords a simple and yet effective means of reducing or preventing the carry over of bed particles by effectively isolating the horizontal gas flow from the freeboard space and exerting a cyclonic or arresting action on the entrained particles.

It will be appreciated that the invention is not confined to an apparatus in which the gas exit is located at one end of the body. For example, a gas exit may be positioned in the centre of the roof of the body in which case horizontal gas flows would be generated towards the exit.

Furthermore, the invention is not limited to apparatus for combustion and may therefore be employed for other processes or reactions employing a fluidised bed, for example gasification.

What is claimed is:

1. A fluidised bed apparatus including a body, a gas-permeable support plate located within the body for supporting, in use, a fluidised bed of particulate material, a gas exit provided in the body, and a baffle assembly interposed between the gas exit and the support plate at a location in use above the fluidised bed, the baffle assembly comprising at least one duct along at least part of the length of the baffle assembly, a number of inlet means in the duct, and passage means within the duct and interconnecting the inlet means and the gas exit, whereby the at least one duct is adapted to allow flow of exit gases around the duct prior to their egress through the inlet means into the passage means.

2. An apparatus according to claim 1 in which the body is in the form of a cylindrical shell arranged in a horizontal mode and having the gas exit at one end thereof.

3. An apparatus according to claim 1 in which each duct is positioned with the axis in substantial parallelism with the support plate.

4. An apparatus according to claim 1 in which the baffle assembly includes two ducts arranged side by side in spaced relation to one another and to the body.

5. An apparatus according to claim 1 in which each duct is provided with a baffle.

6. An apparatus according to claim 1 in which each duct is circular in section.

7. An apparatus according to claim 1 in which each baffle is of crescent shape in section.

* * * * *